(12) United States Patent
Miller et al.

(10) Patent No.: US 11,834,159 B2
(45) Date of Patent: Dec. 5, 2023

(54) TORQUE BUTTON BUSHING

(71) Applicant: GOODRICH CORPORATION, Charlotte, NC (US)

(72) Inventors: Brent Miller, Tipp City, OH (US); Scott Whittle, Springboro, OH (US); Rebecca M. Sivon, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 192 days.

(21) Appl. No.: 17/504,076

(22) Filed: Oct. 18, 2021

(65) Prior Publication Data

US 2023/0124506 A1 Apr. 20, 2023

(51) Int. Cl.
| | |
|---|---|
| *F16D 65/18* | (2006.01) |
| *B64C 25/44* | (2006.01) |
| *F16D 55/36* | (2006.01) |
| *F16D 65/12* | (2006.01) |
| *F16D 55/00* | (2006.01) |
| *F16D 65/02* | (2006.01) |

(52) U.S. Cl.
CPC .............. *B64C 25/44* (2013.01); *F16D 55/36* (2013.01); *F16D 65/123* (2013.01); *F16D 65/18* (2013.01); *F16D 2055/0058* (2013.01); *F16D 2065/132* (2013.01); *F16D 2065/1324* (2013.01); *F16D 2065/1364* (2013.01); *F16D 2065/1376* (2013.01); *F16D 2200/0021* (2013.01); *F16D 2200/0052* (2013.01)

(58) Field of Classification Search
CPC ........ F16D 55/36; F16D 65/18; F16D 65/186; B64C 25/42; B64C 25/44; F16B 2200/40
See application file for complete search history.

(56) References Cited

U.S. PATENT DOCUMENTS

| | | | | |
|---|---|---|---|---|
| 5,494,138 | A | * | 2/1996 | Scelsi .................... F16D 55/36 188/18 A |
| 5,908,091 | A | * | 6/1999 | Berwanger ......... F16D 65/0006 188/73.35 |
| 5,992,577 | A | * | 11/1999 | Souetre ................... F16D 55/36 188/196 R |
| 6,003,954 | A | | 12/1999 | Everhard et al. |
| 8,616,344 | B2 | | 12/2013 | Baden |
| 9,670,975 | B1 | | 6/2017 | Rook |
| 10,274,034 | B2 | | 4/2019 | Fiala et al. |
| 10,408,290 | B2 | | 9/2019 | Leiva et al. |
| 10,677,278 | B2 | | 6/2020 | Houser |
| 10,941,823 | B2 | | 3/2021 | Reed et al. |

(Continued)

FOREIGN PATENT DOCUMENTS

ES 2342703 5/2011

*Primary Examiner* — Nicholas J Lane
(74) *Attorney, Agent, or Firm* — SNELL & WILMER L.L.P.

(57) ABSTRACT

A braking arrangement includes a torque plate, a torque button, and a sacrificial bushing. The torque button comprises a head portion and a shaft portion, wherein the head portion is configured to extend at least partially into a torque pocket of an end plate of a brake stack and the shaft portion is configured to extend through an aperture disposed in a back leg of the torque plate. The bushing is configured to be removably coupled between the shaft portion of the torque button and the back leg of the torque plate.

20 Claims, 6 Drawing Sheets

(56) References Cited

U.S. PATENT DOCUMENTS

| | | | |
|---|---|---|---|
| 2005/0125946 A1* | 6/2005 | Sucic | B64C 27/32 |
| | | | 16/2.1 |
| 2008/0078864 A1* | 4/2008 | Wilkerson | B64D 45/02 |
| | | | 244/1 A |
| 2008/0302613 A1* | 12/2008 | Souetre | F16D 55/36 |
| | | | 188/71.5 |
| 2010/0140027 A1* | 6/2010 | Baden | F16D 65/0006 |
| | | | 188/71.5 |
| 2013/0202450 A1* | 8/2013 | Ivakitch | F16B 5/02 |
| | | | 411/367 |
| 2015/0136547 A1* | 5/2015 | Chambard | F16D 65/126 |
| | | | 188/218 XL |
| 2019/0092484 A1* | 3/2019 | Whiteford | B64D 27/26 |
| 2020/0001985 A1* | 1/2020 | Skinner | B60B 3/087 |
| 2020/0096064 A1 | 3/2020 | Stevenson et al. | |
| 2021/0254658 A1* | 8/2021 | Schmidt | F16C 33/121 |

\* cited by examiner

TORQUE BUTTON BUSHING

FIELD

In general, the arrangements disclosed herein relate to braking systems and methods. More specifically, they relate to torque button and torque plate connections for braking systems.

BACKGROUND

Aircraft braking systems typically employ a plurality of brake discs alternately splined to the wheel and axle of an aircraft. The plurality of brake discs include rotors and stators that are compressed to slow or stop the rotation of the rotors and associated wheel. In this regard, torsional forces are transferred between the axle and the stators at various connection points thereof.

SUMMARY

A braking arrangement is disclosed, comprising a torque plate comprising a torque tube and a back leg, an end plate comprising a torque pocket, a torque button comprising a head portion and a shaft portion, wherein the head portion is configured to extend at least partially into the torque pocket and the shaft portion is configured to extend through an aperture disposed in the back leg, and a bushing configured to be removably coupled between the shaft portion of the torque button and the back leg of the torque plate.

In various embodiments, the torque tube comprises an annular barrel.

In various embodiments, the back leg comprises an annular plate.

In various embodiments, an outer surface of the bushing is configured to contact the back leg and an inner surface of the bushing is configured to contact the shaft portion of the torque button.

In various embodiments, the bushing is further configured to be received at least partially into the aperture.

In various embodiments, the bushing is configured to surround the shaft portion of the torque button.

In various embodiments, a total length of the bushing is less than a total length of the shaft portion of the torque button.

In various embodiments, the torque plate comprises a first material and the bushing comprises a second material, wherein the second material is softer than the first material.

In various embodiments, the first material is titanium.

A torque plate arrangement is disclosed, comprising a torque plate comprising a torque tube defining a first central axis and a back leg, the back leg comprises an aperture defining a second central axis, a bushing configured to be received by the aperture, and a torque button comprising a head portion and a shaft portion, wherein the shaft portion is configured to be received by the bushing.

In various embodiments, the first central axis is substantially parallel to the second central axis.

In various embodiments, the torque tube comprises an annular barrel.

In various embodiments, the back leg comprises an annular plate.

In various embodiments, the torque plate comprises a first material and the bushing comprises a second material, wherein the second material is softer than the first material.

In various embodiments, the torque button comprises a first material and the bushing comprises a second material, wherein the second material is softer than the first material.

In various embodiments, the torque plate is made of titanium.

In various embodiments, the shaft portion of the torque button comprises a through hole for receiving a pin.

A method for assembling a braking arrangement is disclosed, comprising moving a bushing into an aperture disposed in a back leg of a torque plate, moving a shaft portion of a torque button into the bushing, and moving an end plate over a torque tube of the torque plate.

In various embodiments, the method further comprises moving a head portion of the torque button into a torque pocket disposed in the end plate.

In various embodiments, the step of moving the end plate over the torque tube includes moving the end plate parallel to a central axis of the torque plate, and the step of moving the head portion of the torque button into the torque pocket is performed in response to moving the end plate parallel to the central axis of the torque plate.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component. All ranges may include the upper and lower values, and all ranges and ratio limits disclosed herein may be combined. Unless specifically stated otherwise, reference to "a," "an" or "the" may include one or more than one and reference to an item in the singular may also include the item in the plural.

Torque plates can experience wear at the contact surfaces with the torque button, which is typically manufactured using a tougher material than the torque plate. Wear of the torque plate can lead to an unserviceable condition and, ultimately, the scrapping of the torque plate. Use of a sacrificial bushing would allow wear to occur and the bushing to be replaced as desired to allow the torque plate to remain in service. The present disclosure provides, in various embodiments, a braking arrangement including a torque plate, a torque button, and a sacrificial bushing disposed therebetween. The bushing is configured to be replaced as desired, thereby tending to allow the torque plate and/or torque button to remain in service.

Figure 1A:
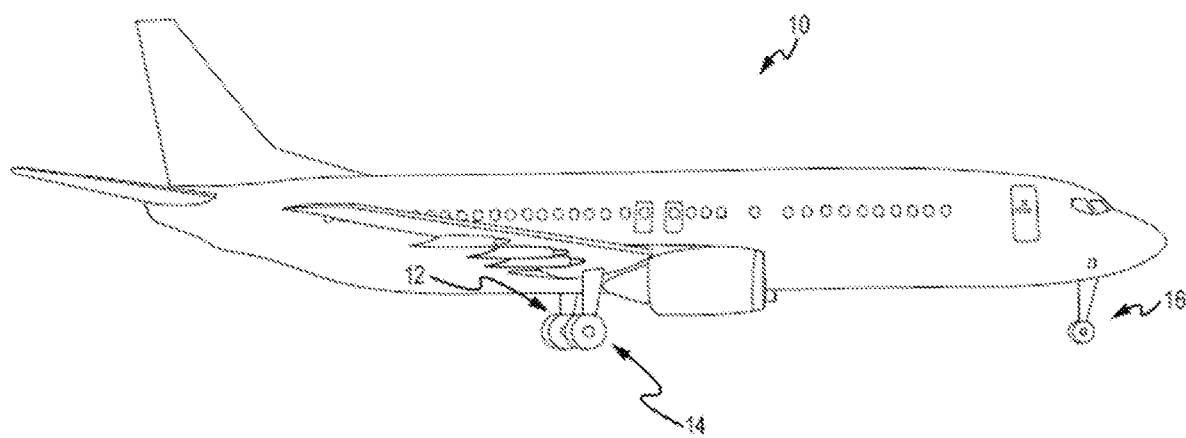
FIG. 1A illustrates an exemplary aircraft having a brake system, in accordance with various embodiments.
Figure 1B:
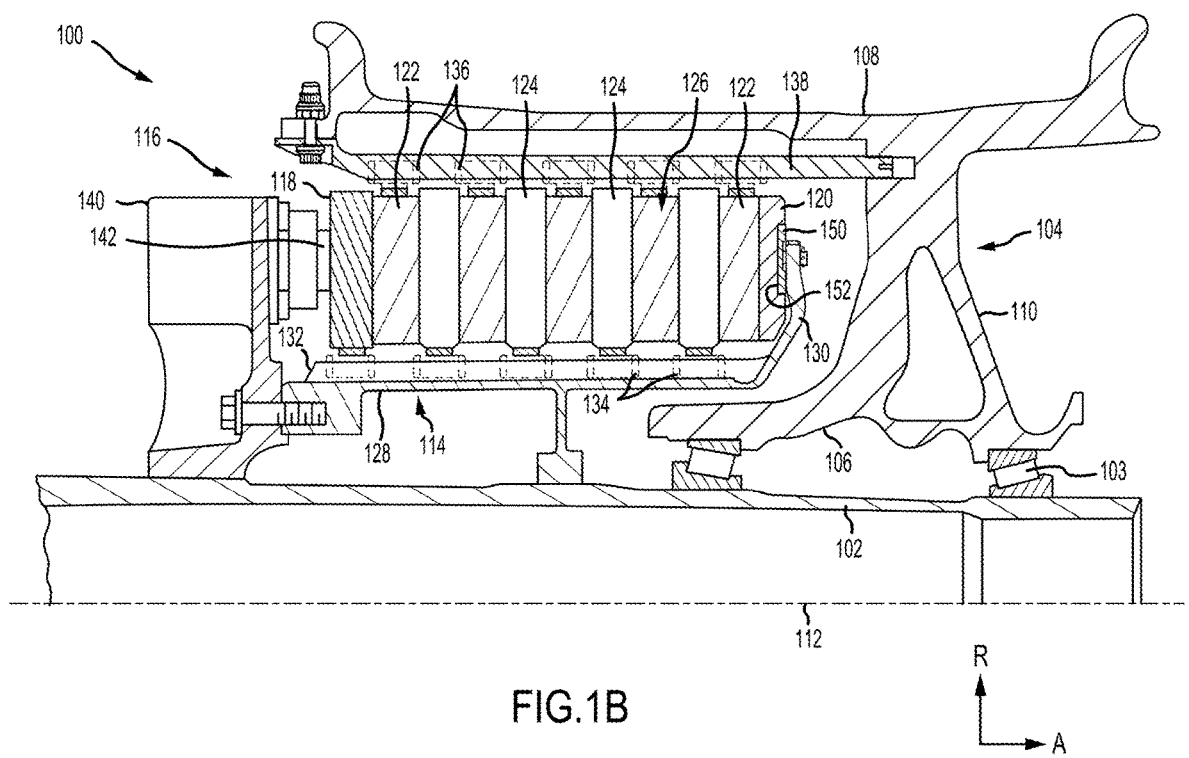
FIG. 1B illustrates a cross-sectional view of a brake mechanism, in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just described, the disclosure nevertheless contemplates any number of landing gear configurations. Referring now to FIG. 1B, there is schematically depicted a brake mechanism 100 configured for use on a landing gear, such as, for example, each of the left main landing gear 12 and the right main landing gear 14 described above with reference to FIG. 1A. In various embodiments, the brake mechanism is mounted relative to an axle 102 for use with a wheel 104 disposed on and configured to rotate about the axle 102 via one or more bearing assemblies 103. A central axis 112 extends through the axle 102 and defines a center of rotation of the wheel 104. A torque plate 114 (sometimes referred to as a torque tube) is aligned concentrically with the wheel 104, which is rotatable relative to the torque plate 114.

The brake mechanism 100 includes a piston housing assembly 116, a pressure plate 118 disposed adjacent the piston housing assembly 116, an end plate 120 positioned a distal location from the piston housing assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake stack 126 (or brake heat sink). The pressure plate 118, the end plate 120 and the plurality of stator disks 124 are connected to the torque plate 114 and remain rotationally stationary relative to the axle 102. The plurality of rotor disks 122 are connected to the wheel 104 and rotate relative to the pressure plate 118, the end plate 120 and the plurality of stator disks 124.

The torque plate 114 may include an annular barrel or torque tube 128 and an annular plate or back leg 130. The back leg 130 is disposed at an end distal from the piston housing assembly 116 and may be made monolithic with the torque plate 114, as illustrated in FIG. 1B, or may be made as a separate annular piece and suitably connected to the torque tube 128. The torque plate 114 has a plurality of circumferentially spaced and axially extending splines 132 disposed on an outer surface of the torque tube 128. The plurality of stator disks 124 and the pressure plate 118 include notches or slots 134 on an inner periphery of the disks and the plate for engagement with the splines 132, such that each disk and the plate are axially slidable with respect to the torque tube 128. The end plate 120 is suitably connected to the back leg 130 of the torque plate 114 and is held non-rotatable, together with the plurality of stator disks 124 and the pressure plate 118, during a braking action. Torque plate 114 may extend through the end plate 120. Torque plate 114 may be an annular plate. The plurality of rotor disks 122, interleaved between the pressure plate 118, the end plate 120 and the plurality of stator disks 124, each have a plurality of circumferentially spaced notches or slots 136 along an outer periphery of each disk for engagement with a plurality of torque bars 138 that are secured to or made monolithic with an inner periphery of the wheel 104.

An actuating mechanism for the brake mechanism 100 includes a plurality of piston assemblies, circumferentially spaced around a piston housing 140 (only one piston assembly is illustrated in FIG. 1B). Each of the plurality of piston assemblies includes a piston 142 configured to apply a load against the pressure plate 118. Upon actuation, the plurality of piston assemblies affect a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as ceramic matrix composites, that enable the brake disks to withstand and dissipate the heat generated during and following a braking action.

Figure 2:
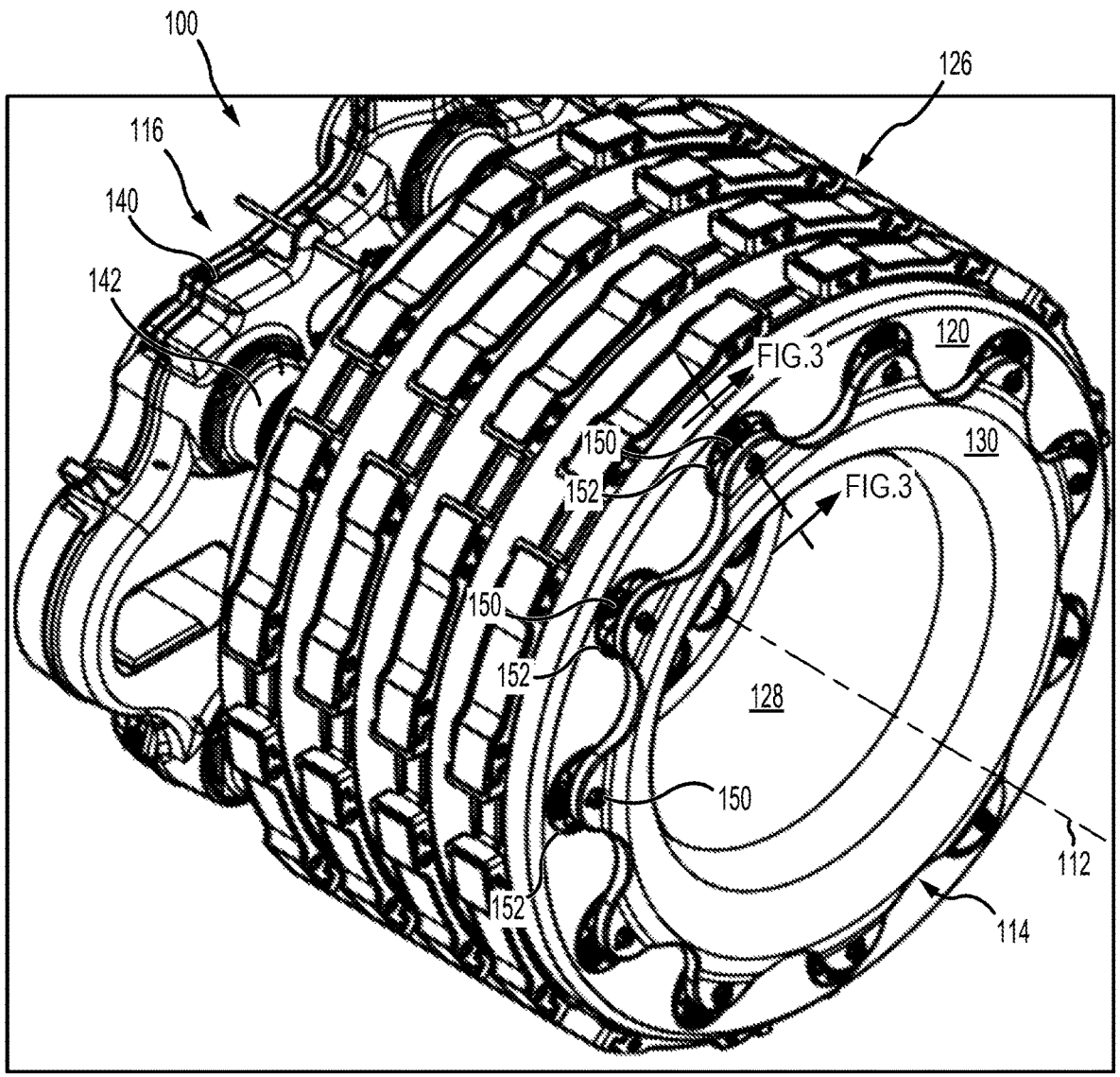
FIG. 2 illustrates a perspective view of the end of brake mechanism distal from the piston housing assembly with the wheel and axle omitted, in accordance with various embodiments.

With respect to FIG. 2, elements with like element numbering, as depicted in FIG. 1B, are intended to be the same and will not necessarily be repeated for the sake of clarity.

With combined reference to FIG. 1B and FIG. 2, a plurality of torque buttons 150 may be disposed between torque plate 114 and end plate 120. Torque buttons 150 may be circumferentially spaced around back leg 130. Torque buttons 150 may extend axially (i.e., parallel central axis 112) from back leg 130 towards piston housing 140. Each torque button 150 may extend into an axially adjacent (i.e., referring to a direction parallel to central axis 112) torque pocket 152 disposed in end plate 120. Each torque button 150 may be generally concentrically aligned with its associated torque pocket 152. In this regard, brake mechanism 100 may comprise a plurality of torque button 150/torque pocket 152 pairs. In this manner, torsional forces may be transferred between end plate 120 and back leg 130. State differently, each torque button 150 and associated torque pocket 152 may create a mechanical interference that prevents rotation of end plate 120 about central axis 112 with respect to back leg 130.

Figure 3A:
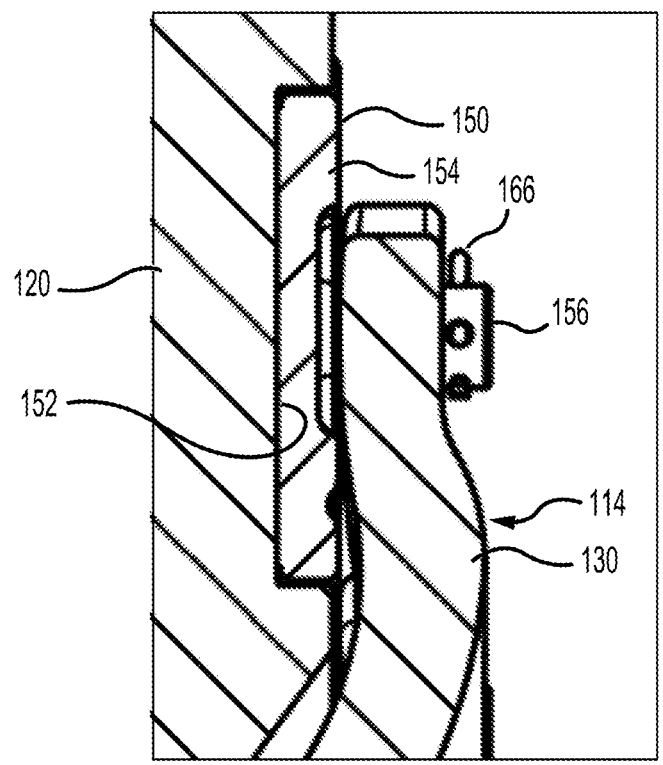
FIG. 3A and FIG. 3B illustrate section views of a torque button and a sacrificial torque button bushing in an installed position, in accordance with various embodiments.
Figure 3B:
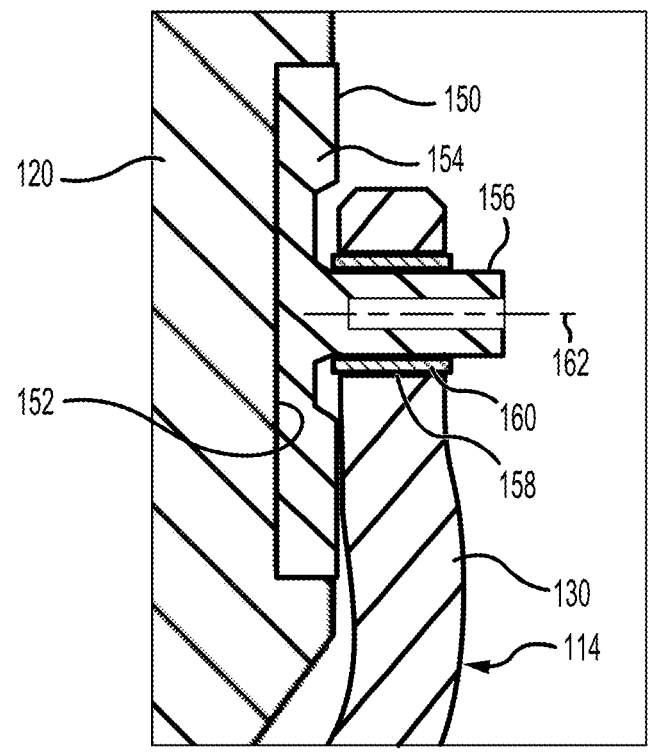

With respect to FIG. 3A and FIG. 3B, elements with like element numbering, as depicted in FIG. 1B and FIG. 2, are intended to be the same and will not necessarily be repeated for the sake of clarity.

With combined reference to FIG. 3A and FIG. 3B, each torque button 150 may comprise a head portion 154 and a shaft portion 156 extending from the head portion 154. In various embodiments, the shaft portion 156 and the head portion 154 are in concentric alignment. In various embodiments, the head portion 154 is a round plate. In various embodiments, the head portion 154 is an annular plate. Various forces (e.g., torsional forces and/or radial forces) are transmitted through torque button 150 during braking operations. More particularly, these forces may be transmitted between torque plate 114 and end plate 120 via torque button 150. Shaft portion 156 extends through aperture 158 disposed in back leg 130. In this regard, repeated operation of the brake mechanism tends to wear and/or deform the back leg 130 at the location of aperture 158. In this regard, a bushing 160 is provided to prevent wear of back leg 130 at aperture 158 during operation of the brake mechanism. Depending on the material properties of torque button 150, bushing 160 may similarly be provided to prevent wear of torque button 150 during operation of the brake mechanism In various embodiments, torque plate 114 is made of a material which is softer than that of torque button. For example torque plate 114 may be made of a first material such as titanium for example (e.g., cast titanium), and torque button 150 may be made of a second material such as steel for example. While the Brinell hardness of steel can vary with heat treatment and alloy composition, steel is typically harder than titanium. Thus, because the material of torque button 150 is generally tougher than the material of torque plate 114, torque button 150 may tend to deform torque plate 114 when forces are being transmitted therebetween. In this regard, bushing 160 may be removably coupled between torque plate 114 and torque button 150 as a sacrificial part that can be replaced after bushing 160 becomes worn as desired. Bushing 160 may be made of any suitable material, such as a bronze alloy, such as nickel aluminum bronze. The material of the bushing 160 may be softer than the material of torque plate 114. In this manner, because the material of bushing 160 is softer than the material of torque plate 114, bushing 160 may protect torque plate 114 from becoming deformed by torque button 150.

In various embodiments, torque plate 114 may conversely be made of a material which is harder than that of torque button 150. In this regard, torque button 150 may tend to be deformed by torque plate 114 when forces are transmitted therebetween. In this regard, bushing 160 may be made of a material that is softer than the material of torque button 150 to protect torque button 150 from becoming deformed.

In various embodiments, bushing 160 is shaped to be a hollow cylindrical shaft. In various embodiments, bushing 160 is shaped like a top hat (i.e., comprising a hollow cylindrical shaft with a radially outwardly extending flange disposed at an end thereof). Bushing 160 may be placed over the shaft portion 156. Stated differently, bushing 160 may be configured to receive shaft portion 156. Bushing 160 may be configured to circumferentially surround the shaft portion 156. Bushing 160 and shaft portion 156 may be in concentric alignment when bushing 160 is installed onto torque button 150. Bushing 160 may be received by aperture 158. The outer surface of bushing 160 may contact back leg 130 and the inner surface of bushing 160 may contact shaft portion 156.

Head portion 154 of torque button 150 may be configured to extend at least partially into the torque pocket 152. Head portion 154 may be substantially flush with end plate 120 when head portion 154 is in the installed position in torque pocket 152. However, head portion 154 may extend at least partially into torque pocket 152 such that end plate 120 and head portion 154 are not substantially flush, in accordance with various embodiments. Shaft portion 156 may be configured to extend through aperture 158 of back leg 130. Aperture 158 may define a central axis 162. Central axis 162 may be substantially parallel to central axis 112 (see FIG. 2).

Figure 4:
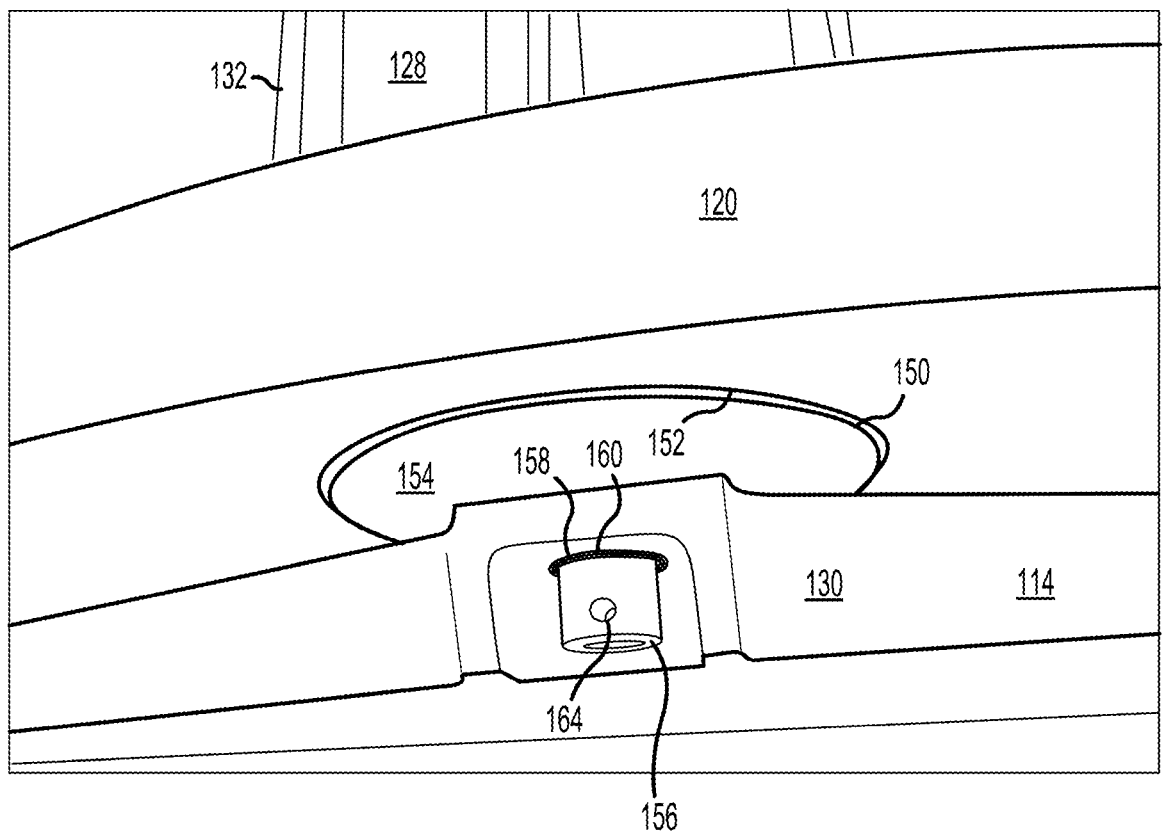
FIG. 4 illustrates a perspective view of a torque button and a sacrificial torque button bushing in an installed position, in accordance with various embodiments.

With respect to FIG. 4, elements with like element numbering, as depicted in FIG. 1B through FIG. 3B, are intended to be the same and will not necessarily be repeated for the sake of clarity.

With reference to FIG. 4, a perspective view of a torque button 150 and bushing 160 in their respective installed positions is illustrated, in accordance with various embodiments. In various embodiments, shaft portion 156 comprises a through hole 164 configured to receive a pin 166 (see FIG. 3A) for securing torque button 150 to torque plate 114.

Figure 5:
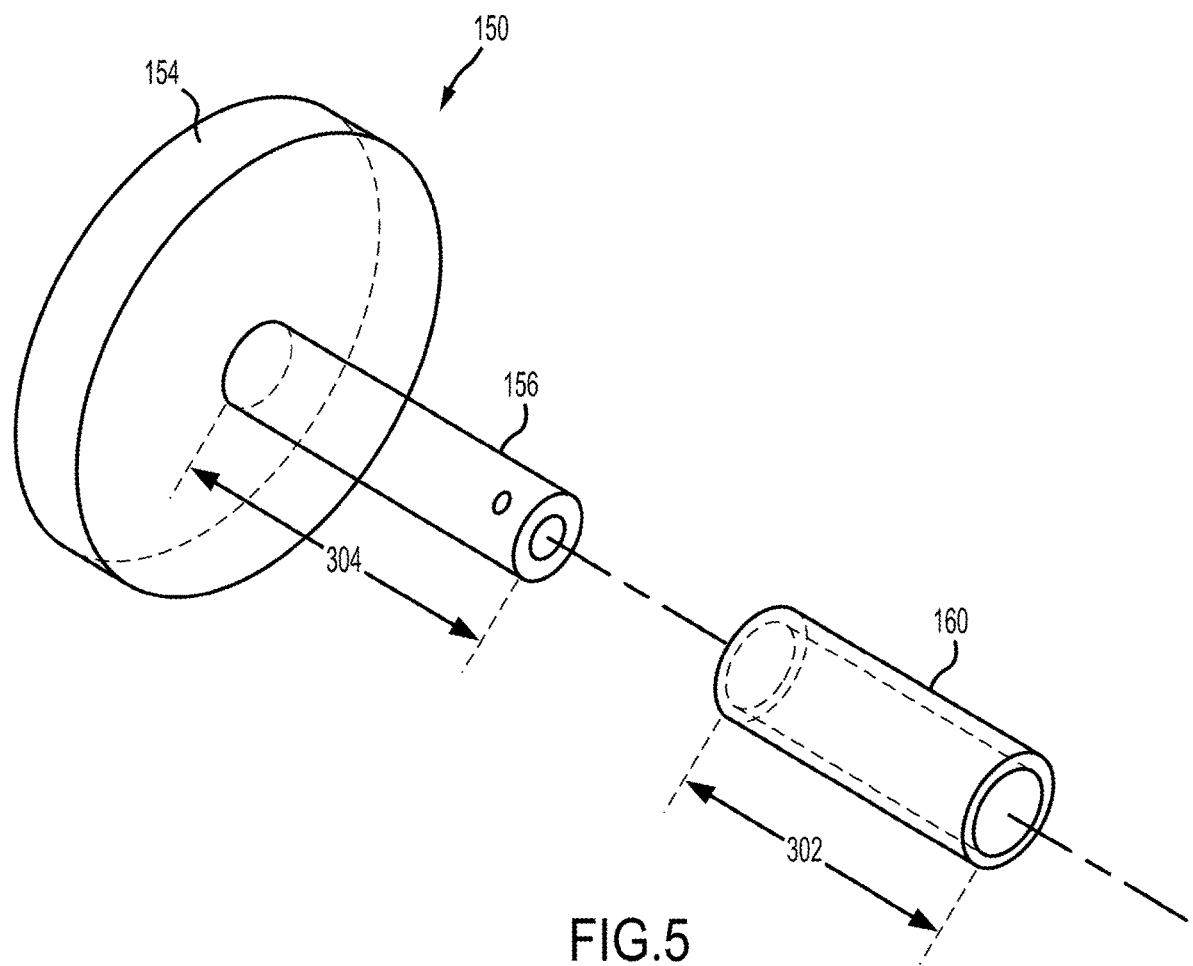
FIG. 5 illustrates an assembly view of a torque button and torque button bushing, in accordance with various embodiments.

With respect to FIG. 5, elements with like element numbering, as depicted in FIG. 1B through FIG. 4, are intended to be the same and will not necessarily be repeated for the sake of clarity.

With reference to FIG. 5, an assembly view of torque button 150 and bushing 160 is illustrated, in accordance with various embodiments. In various embodiments, a total length 302 of bushing 160 may be less than a total length 304 of shaft portion 156.

With combined reference to FIG. 3B and FIG. 5, to assemble the braking arrangement, bushing 160 may be moved into aperture 158. In various embodiments, bushing 160 is press fit into aperture 158. In various embodiments, bushing 160 is placed into aperture 158 in a non-press fit design, wherein the outer diameter of bushing 160 is less than the inner diameter of aperture 158 such that bushing 160 is loosely disposed in aperture 158. In this manner, bushing 160 may be sufficiently held in place between the head portion 154 of torque button 150 and the terminus of shaft portion 156 opposite head portion 154; for example bushing 160 may be mechanically blocked from sliding off shaft portion 156 by pin 166 or the like. Before or after the bushing 160 is moved into aperture 158, shaft portion 156 may be moved into the bushing 160. In various embodiments, shaft portion 156 is press fit into bushing 160. End plate 120 may be moved over torque tube 128 (see FIG. 1B). As the end plate 120 is slide (parallel central axis 112) over torque tube 128 towards back leg 130, head portion 154 may enter into torque pocket 152. End plate 120 may be moved towards back leg 130 until head portion 154 contacts the back surface of torque pocket 152.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. A braking arrangement, comprising:
   a torque plate comprising a torque tube and a back leg;
   an end plate comprising a torque pocket;
   a torque button comprising a head portion and a shaft portion, wherein the head portion is configured to extend at least partially into the torque pocket and the shaft portion is configured to extend through an aperture disposed in the back leg; and
   a bushing configured to be removably coupled between the shaft portion of the torque button and the back leg of the torque plate.

2. The braking arrangement of claim 1, wherein the torque tube comprises an annular barrel.

3. The braking arrangement of claim 2, wherein the back leg comprises an annular plate.

4. The braking arrangement of claim 1, wherein an outer surface of the bushing is configured to contact the back leg and an inner surface of the bushing is configured to contact the shaft portion of the torque button.

5. The braking arrangement of claim 4, wherein the bushing is further configured to be received at least partially into the aperture.

6. The braking arrangement of claim 5, wherein the bushing is configured to surround the shaft portion of the torque button.

7. The braking arrangement of claim 1, wherein a total length of the bushing is less than a total length of the shaft portion of the torque button.

8. The braking arrangement of claim 1, wherein the torque plate comprises a first material and the bushing comprises a second material, wherein the second material is softer than the first material.

9. The braking arrangement of claim 8, wherein the first material is titanium.

10. A torque plate arrangement, comprising:
    a torque plate comprising a torque tube defining a first central axis and a back leg, the back leg comprises an aperture defining a second central axis;
    a bushing configured to be received by the aperture; and
    a torque button comprising a head portion and a shaft portion, wherein the shaft portion is configured to be received by the bushing.

11. The torque plate arrangement of claim 10, wherein the first central axis is substantially parallel to the second central axis.

12. The torque plate arrangement of claim 11, wherein the torque tube comprises an annular barrel.

13. The torque plate arrangement of claim 12, wherein the back leg comprises an annular plate.

14. The torque plate arrangement of claim 13, wherein the torque plate comprises a first material and the bushing comprises a second material, wherein the second material is softer than the first material.

15. The torque plate arrangement of claim 13, wherein the torque button comprises a first material and the bushing comprises a second material, wherein the second material is softer than the first material.

16. The torque plate arrangement of claim 14, wherein the torque plate is made of titanium.

17. The torque plate arrangement of claim 10, wherein the shaft portion of the torque button comprises a through hole for receiving a pin.

18. A method for assembling a braking arrangement, comprising:
   moving a bushing into an aperture disposed in a back leg of a torque plate;
   moving a shaft portion of a torque button into the bushing; and
   moving an end plate over a torque tube of the torque plate.

19. The method of claim 18, further comprising moving a head portion of the torque button into a torque pocket disposed in the end plate.

20. The method of claim 19, wherein the moving the end plate over the torque tube includes moving the end plate parallel to a central axis of the torque plate, and the moving the head portion of the torque button into the torque pocket is performed in response to moving the end plate parallel to the central axis of the torque plate.

* * * * *